United States Patent
Oaki (10) Patent No.: US 7,796,803 B2
(45) Date of Patent: Sep. 14, 2010

(54) IMAGE CORRECTION METHOD AND APPARATUS FOR USE IN PATTERN INSPECTION SYSTEM

(75) Inventor: Junji Oaki, Kanagawa (JP)

(73) Assignee: Advanced Mask Inspection Technology Inc., Yokohama-shi (JP)

(*) Notice: Subject to any disclaimer, the term of this patent is extended or adjusted under 35 U.S.C. 154(b) by 951 days.

(21) Appl. No.: 11/567,550

(22) Filed: Dec. 6, 2006

(65) Prior Publication Data

US 2008/0050008 A1 Feb. 28, 2008

(30) Foreign Application Priority Data

Aug. 24, 2006 (JP) .............. 2006-227347

(51) Int. Cl.
G06K 9/00 (2006.01)
G06K 9/62 (2006.01)

(52) U.S. Cl. ..................... 382/144; 382/209

(58) Field of Classification Search ......... 382/141–152, 382/209, 218, 309, 173, 274; 348/125–126
See application file for complete search history.

(56) References Cited

U.S. PATENT DOCUMENTS

| 7,487,491 B2 * | 2/2009 | Oaki et al. ............ 716/21 |
| 2006/0018530 A1 | 1/2006 | Oaki et al. |
| 2006/0215899 A1 | 9/2006 | Oaki |
| 2006/0215900 A1 | 9/2006 | Oaki et al. |
| 2006/0222233 A1 | 10/2006 | Sugihara et al. |

FOREIGN PATENT DOCUMENTS

| JP | 10-96613 | 4/1998 |
| JP | 10-155139 | 6/1998 |
| JP | 2000-105832 | 4/2000 |
| JP | 2000-241136 | 9/2000 |
| JP | 2000-348177 | 12/2000 |
| JP | 2003-287419 | 10/2003 |
| JP | 2006-30518 | 2/2006 |

OTHER PUBLICATIONS

U.S. Appl. No. 11/360,580, filed Feb. 24, 2006, Junji Oaki, et al.
U.S. Appl. No. 11/360,813, filed Feb. 24, 2006, Junji Oaki, et al.
U.S. Appl. No. 11/360,657, filed Feb. 24, 2006, Junji Oaki, et al.
U.S. Appl. No. 11/360,679, filed Feb. 24, 2006, Junji Oaki, et al.
U.S. Appl. No. 11/567,520, filed Dec. 6, 2006, Oaki.

* cited by examiner

*Primary Examiner*—Daniel G Mariam
(74) *Attorney, Agent, or Firm*—Oblon, Spivak, McClelland, Maier & Neustadt, L.L.P.

(57) ABSTRACT

A technique for correcting an image by using frequency division images and decomposition images corresponding in number to reference points is disclosed. An image correction apparatus includes an image divider which divides an inspection reference image into frequency regions to form frequency division images, a decomposition image generator for defining reference points at several locations within at least one frequency division image and for applying weighting with each reference point as a reference to thereby generate decomposition images corresponding in number to the reference points, a model parameter identifier for identifying a model parameter by using 2D linear prediction models of an image being tested, the decomposition images and a frequency division image which is out of the generation of decomposition images, and a model image generator for using the model parameter to generate a model image. An image inspection apparatus using the correction apparatus and an image correction method are also disclosed.

5 Claims, 8 Drawing Sheets

IMAGE CORRECTION METHOD AND APPARATUS FOR USE IN PATTERN INSPECTION SYSTEM

CROSS-REFERENCE TO RELATED APPLICATION(S)

Priority is claimed to Japanese Patent Application No. 2006-227347, filed Aug. 24, 2006, the disclosure of which is incorporated herein by reference.

FIELD OF THE INVENTION

The present invention relates generally to image correction and inspection technologies, and more particularly to a method and apparatus for correcting ultrafine pattern images as formed on reticles for use in the manufacture of highly integrated semiconductor circuit devices, such as LSI chips. This invention also relates to a pattern inspection apparatus which uses the image correction technique to inspect a pattern image for defects.

RELATED ART

In general, microfabrication processes of LSI devices require increased costs, which in turn makes it inevitable for semiconductor manufacturers to improve production yields. There are several factors which lower yields, one of which factors is the presence of defects in reticle patterns for use during lithography-based exposure and transfer of an ultrafine circuit pattern onto semiconductor wafers. In recent years, a decrease in LSI pattern size results in a likewise decrease in minimum feature size of defects to be detected. Due to this, a need is felt to further enhance the accuracy and precision of an image inspection apparatus for inspecting reticles for defects.

Pattern defect inspection methodology is categorized into two major approaches, one of which is based on die-to-die (DD) comparison schemes, and the other of which is on die-to-database (DB) comparison. The DD comparison is a method for detecting pattern defects by comparing two dies on a reticle. The DB comparison is a method of sensing defects through comparison of a die pattern to a database as generated from computer-aided design (CAD) data for the LSI design use.

As on-reticle circuit patterns further decrease in minimum feature sizes, a need arises to accurately detect those defects which are so small that these are buried in pixel position misalignment between images under comparison for inspection as well as image expansion/reduction and wave-like or "swell" noises plus sensing noises. In either the DD or DB comparison also, alignment in units of subpixels and image correction prior to the comparison inspection of an inspection reference image and to-be-tested image become very important.

One prior known approach to avoiding the problems is to use a method for performing subpixel alignment based on bicubic interpolation at the pre-stage of comparison inspection of a reference image and an image being tested and, thereafter, sequentially performing image expansion/reduction correction (as disclosed, for example, in JP-A-2000-241136), swell correction, resize correction and noise averaging processing. Unfortunately, repeated execution of these correcting processes would result in occurrence of accumulated or cumulative errors, which in turn causes unwanted reduction of image quality. Another problem faced with the prior art is the difficulty in setting of appropriate values of an increased number of model parameters required for each correction and also in setup of an adequate execution order of respective correction processes.

A technique for avoiding the problems is disclosed in JP-A-2006-030518, which discloses therein an invention for identifying the relationship of an inspection reference pattern image and a pattern image under testing, for establishing a mathematical formula model that achieves absorption or "fitting" of possible image pixel misalignment and expansion/contraction noises and sensing noises, and for comparing the test pattern image to a new version of reference pattern image which is obtained by simulation of such model.

BRIEF SUMMARY OF THE INVENTION

It is an object of the present invention to provide an effective image correction technique which combines together alignment and image correction by use of images as divided by frequency regions and which is less in image degradation and in setup parameters.

In accordance with one aspect of the present invention, an image correction apparatus for generating a model image from an inspection reference image and an image to be tested is provided. The apparatus includes an image division unit operative to divide the reference image into a plurality of frequency regions to thereby form a plurality of frequency division images, a decomposition image generation unit operative to provide reference points at a plurality of spaced-apart locations within at least one of the frequency division images and apply weighting to the frequency division image with each reference point being as a reference to thereby generate decomposition images corresponding in number to the reference points, a model parameter identification unit operative to identify a model parameter by use of two-dimensional linear prediction models of the to-be-tested image, the decomposition images corresponding in number to the reference points and a frequency division image which is out of the generation of decomposition images, and a model image generation unit operative to generate a model image by sing the model parameter thus identified.

In accordance with another aspect of this invention, an image inspection apparatus for inspecting through comparison an inspection reference image and an image being tested is provided. The inspection apparatus includes an image division unit operative to divide the reference image into a plurality of frequency regions to thereby form a plurality of frequency division images, a decomposition image generation unit operative to provide reference points at a plurality of spaced-apart locations within at least one of the frequency division images and apply weighting to the frequency division image with each reference point being as a reference to thereby generate decomposition images corresponding in number to the reference points, a model parameter identification unit operative to identify a model parameter by use of two-dimensional linear prediction models of the test image, the decomposition images corresponding in number to the reference points and a frequency division image which is out of the generation of decomposition images, a model image generation unit operative to generate a model image by using the model parameter thus identified, and a comparison processing unit for performing comparison inspection of the model image and the test image.

In accordance with a further aspect of the invention, an image correction method for generating a model image from an inspection reference image and an image to be tested is provided. This method includes the steps of dividing the reference image into a plurality of frequency regions to thereby form a plurality of frequency division images, providing reference points at a plurality of spaced-apart locations within at least one of the frequency division images and applying weighting to the frequency division image with each reference point being as a reference to thereby generate decomposition images corresponding in number to the reference points, identifying a model parameter by use of two-dimensional linear prediction models of the to-be-tested image, the decomposition images corresponding in number to the reference points, and a frequency division image which is out of the generation of decomposition images, and generating a model image by using the model parameter thus identified.

DETAILED DESCRIPTION OF THE INVENTION

Pattern image correction and image inspection in accordance with illustrative embodiments of this invention will be described with reference to the accompanying drawings below.

(Image Correction Apparatus)

Figure 1:
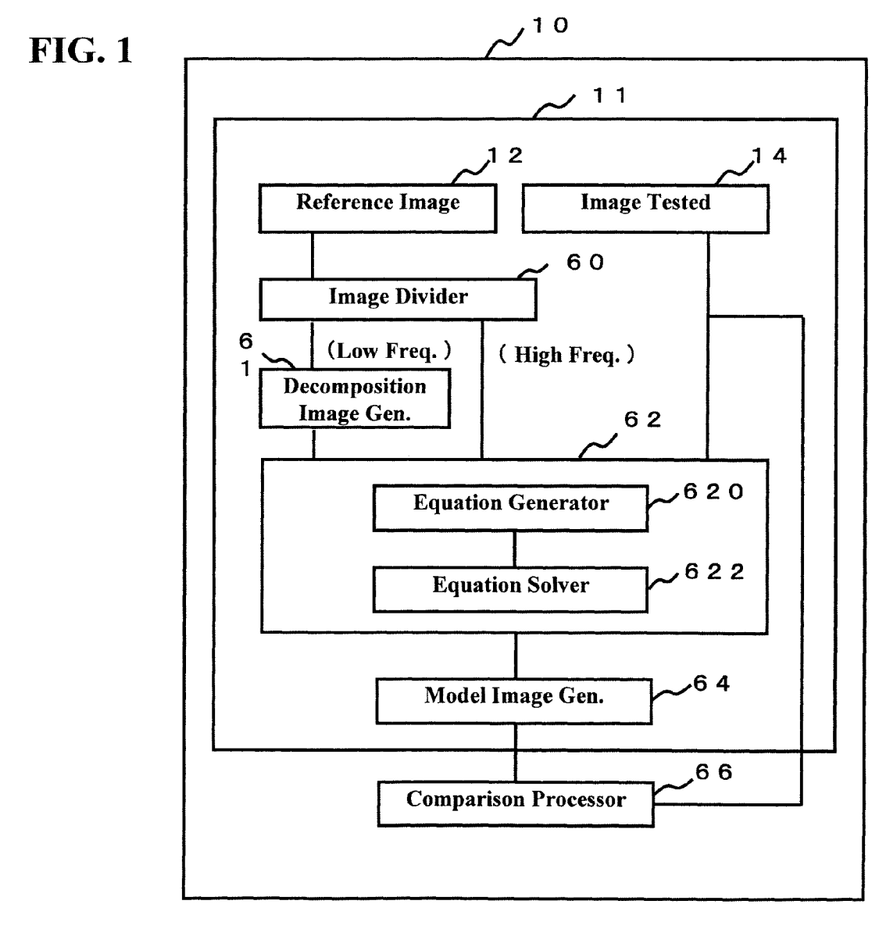
FIG. 1 is a block diagram of a pattern image inspection apparatus embodying the invention.

A configuration of a pattern image inspection apparatus 10 including an image correction device 11 is shown in FIG. 1. The image inspection apparatus 10 is the one that uses the image correction device 11 to generate a model image and compare it to an inspection reference image 14 to thereby detect defects and failures of the image, if any. The image correction device 11 subdivides the reference image 12 into a plurality of image segments of spatial frequency regions, thereby creating more than two frequency division images. The example of FIG. 1 creates a plurality of frequency division images with respect to the reference image 12. The image correction device 11 generates, for one of the frequency division images of the reference image 12, a plurality of decomposed images relative to more than two reference points. The image correction device 11 uses two-dimensional (2D) linear prediction models with respect to is these decomposed images and the remaining frequency division images to obtain model parameters which absorb image pixel position misalignment as well as expansion/reduction noises and sensing noises. Such pixel misalignment/noise absorption is known as the "fitting" among those skilled in the art. The image correction device 11 uses these model parameters to generate a model image and corrects the image of interest. The image inspection apparatus 10 performs comparison processing of this model image and an image 14 to be tested, thereby enabling detection of defects of the to-be-tested image 14, if any. Additionally, the comparison of the reference image 12 and the test image 14 is performed by either one of die-to-die comparison and die-to-database comparison while letting any one of the two images under comparison be the reference image 12 with the other being the test image 14. Which one of these images is set to the reference image may be arbitrarily determined on a case-by-case basis.

As shown in FIG. 1, the image correction device 11 is generally made up of an image division unit 60 which divides the inspection reference image 12 by a plurality of frequency regions, a decomposition image generation unit 61 which creates more than two decomposed images with respect to an image of low-frequency region of the frequency division images as divided by frequency regions, a model parameter identification unit 62 which identifies a model parameter(s) by using 2D linear prediction models for these decomposed images and a frequency division image of high frequency plus the to-be-tested image 14, and a model image generation unit 64 for generating a model image by means of the model parameter(s). The image inspection apparatus 10 is internally equipped with the image correction device 11, and includes a comparison processing unit 66 which compares the model image as obtained from the image correction device 11 and the test image 14 to thereby detect image defects and failures, if any. Although in FIG. 1 the image correction device 11 is arranged to utilize the frequency division image of low frequency region, a frequency division image of high frequency region may alternatively be employable. Still alternatively, both of them are usable at a time. In case there are more than three frequency division images, any one of them is usable.

(Image Divider)

The image divider 60 is the one that divides an image into a plurality of spatial frequency regions and creates more than two frequency division images. Known image dividing methods include sub-band encoding and discrete wavelet conversion. For example, the subband coding is a technique for using filters of low to high frequencies to divide an image into a plurality of portions of different frequency bands. The wavelet conversion is a scheme for dividing an image by sequential decomposition or "disassembling" of low frequency components of the image.

Figure 2:
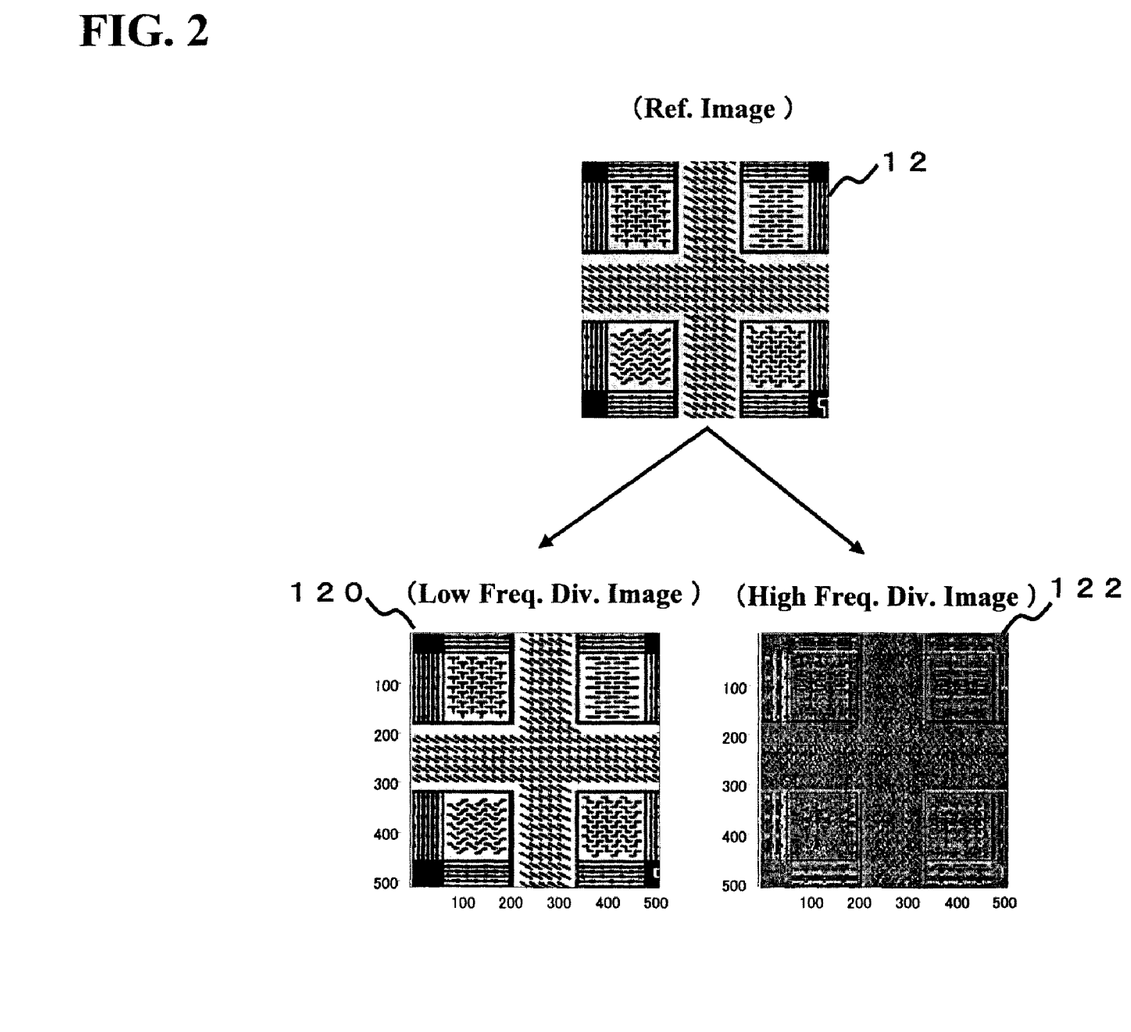
FIG. 2 is an explanation diagram of image inspection using frequency division images.

See FIG. 2, which shows an example of the inspection reference image 12 and two frequency division images which are divided from the reference image 12, i.e., a low frequency division image and a high frequency division image. The image divider 60 may also divide the image into four frequency division images, such as a high frequency division image, "high middle" frequency division image, "low middle" frequency division image, and low frequency division image. The high frequency division image is such that specific image portions with relatively large variance of image pattern are visually emphasized. The low frequency division image is with emphasis on image portions that are less in change.

Figure 3:
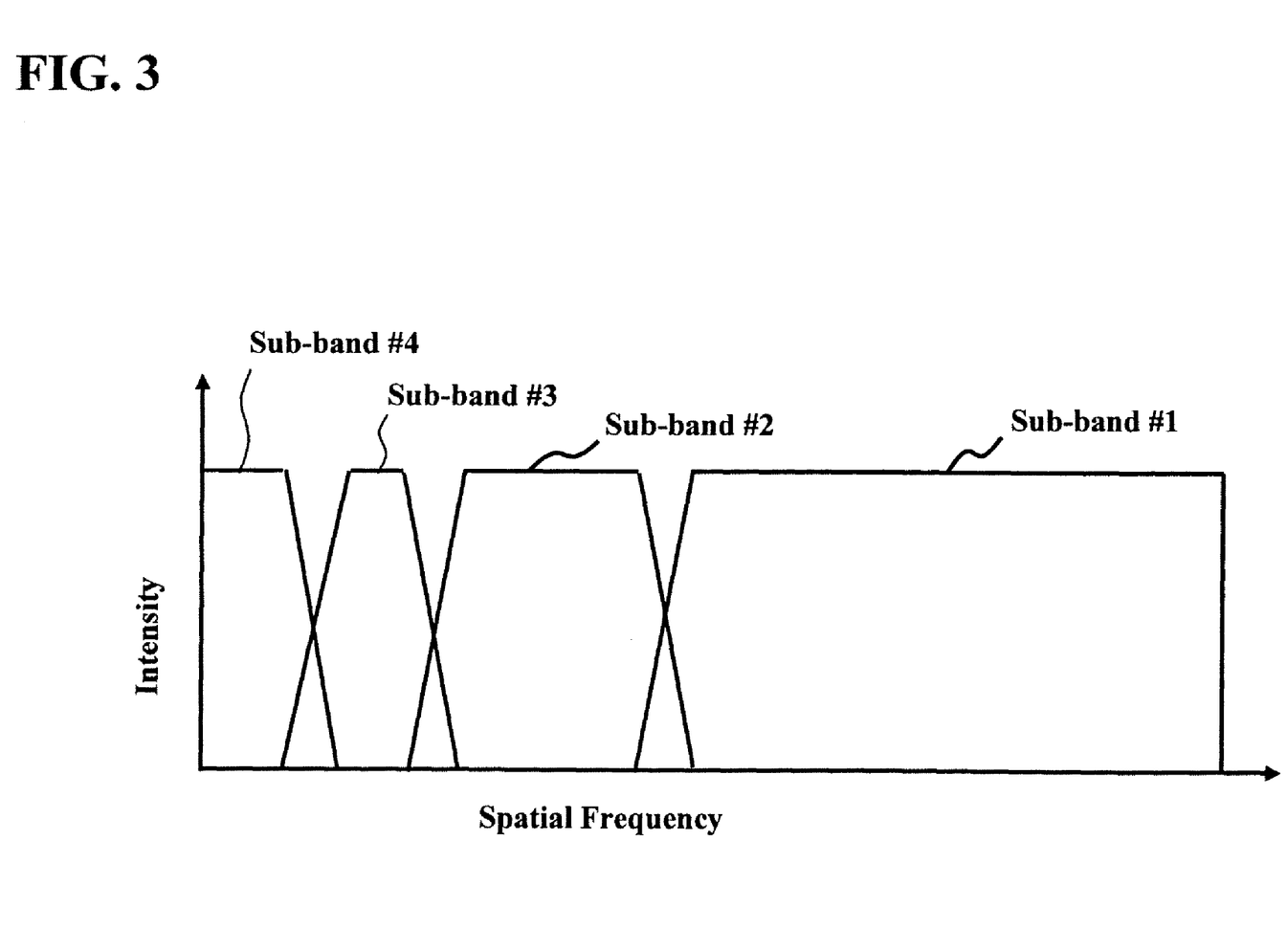
FIG. 3 is an explanation diagram of sub-band encoding is based on octave division.

FIG. 3 is a graph for explanation of the sub-band encoding based on octave division, which shows four exemplary spatial frequency regions, i.e., a sub-band 1 of high frequency region, a subband 2 of high middle frequency region, a subband 3 of low middle frequency region, and a subband 4 of low frequency region. An image may be divided into four frequency division images by using filters of these subbands, for example.

(Decomposition Image Generator)

The decomposition image generator unit 61 is the one that provides a plurality of reference points in an image and applies weighting thereto with each reference point being as a center to thereby decompose or "disassemble" the image into image segments which correspond in number to the reference points. Relatively large variations of spaced-apart image segments, such as image distortions, are the objects to be corrected, wherein the reference points are provided at spaced-apart pixel positions within the image. Preferably, the reference points are set at peripheral portions which are great in difference of image variation. Several approaches are available to providing such reference points in the image and applying weighting with each reference point as the center, one known example of which is to employ a linear interpolation method as will be stated below. (This is disclosed, for example, in "Computer Image Processing," by H. Tamura, Ohmsha (2002), pp. 126-127.)

Figure 4:
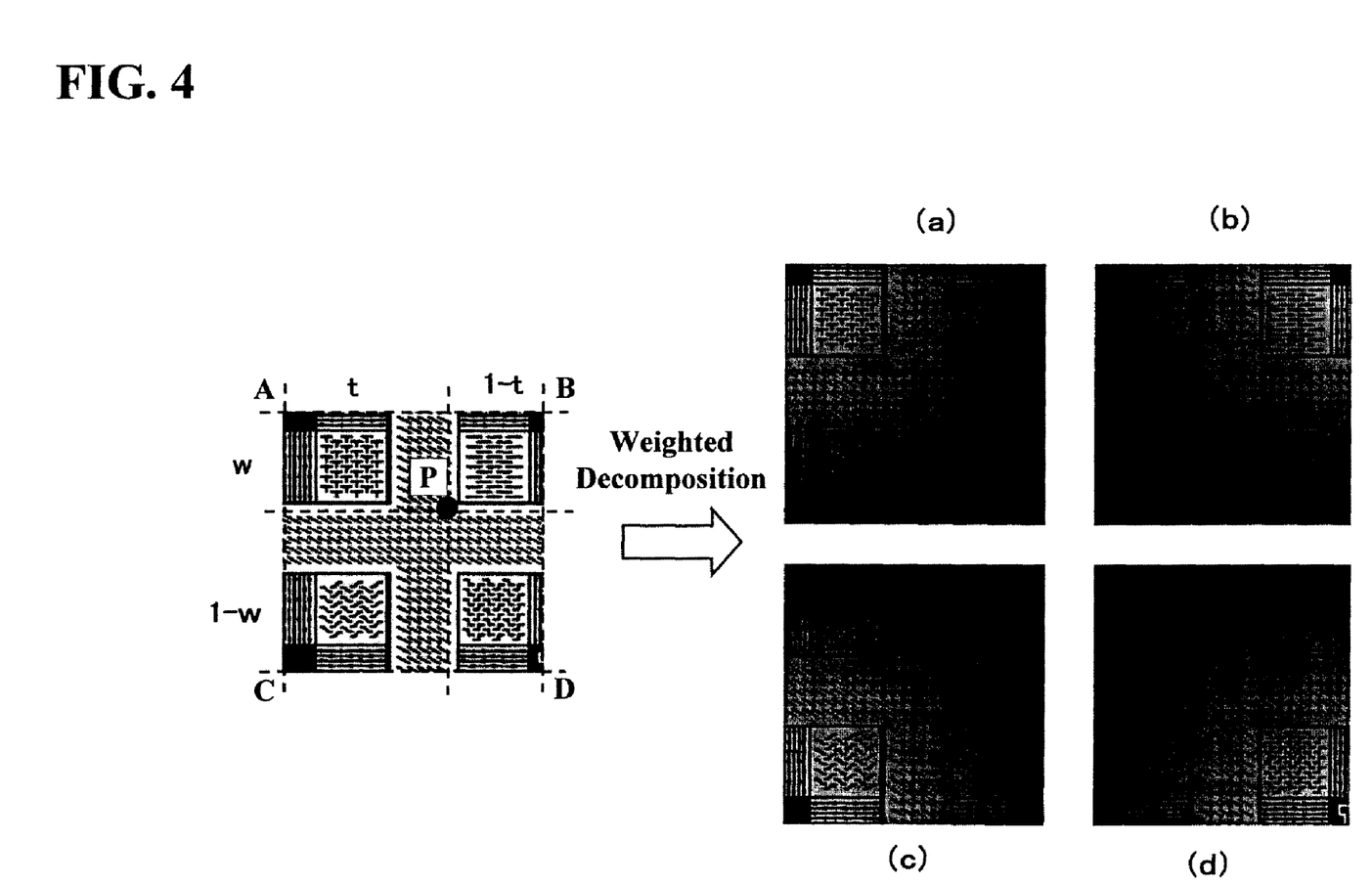
FIG. 4 is an explanation diagram of image decomposition.

FIG. 4 shows four decomposed images "a," "b," "c" and "d," which are obtained by decomposition of the low frequency division image of the inspection reference image 12 while applying linear weighting to four corner edge points "A" to "D" of the image 12. The decomposed images a to d are resulted from four-corner linear weighting decomposition of the reference image 12. These decomposed images are generated, for example, by Equation Set (1), where x is a pixel of the image prior to decomposition, t and w are the parameters for linear interpolation of the points A to D. The parameters t and w are each greater than zero (0) and yet less than one (1). A point P in FIG. 4 has its graytone level that is substantially equal to a total sum of grayscale level values of those pixels of the decomposed images a to d, each corresponding to the point P.

$$\begin{cases} a = (1-t)(1-w) \cdot x \\ b = t(1-w) \cdot x \\ c = (1-t)w \cdot x \\ d = tw \cdot x \end{cases} \quad (1)$$

(Model Parameter Identifier)

The model parameter identifier 62 is the one that obtains through computation one or more model parameters for creation of a model image. This model image is an aimed correction image. The model image is reduced or minimized in pixel misalignment of less than one pixel size, expansion/reduction and swell noises as well as resizing processing and sensing noises, and is capable of achieving correction of entire image distortion and correction of high frequency components. It is thus possible to correct high frequency components while retaining the versatility of four-corner linear weighting division-less schemes. The model parameter identifier 62 includes a functional unit 620 for generation of a set of simultaneous equations and a function unit 622 for solving the equations.

(Equation Generator for 2D Linear Prediction Model Setup)

Figure 5:
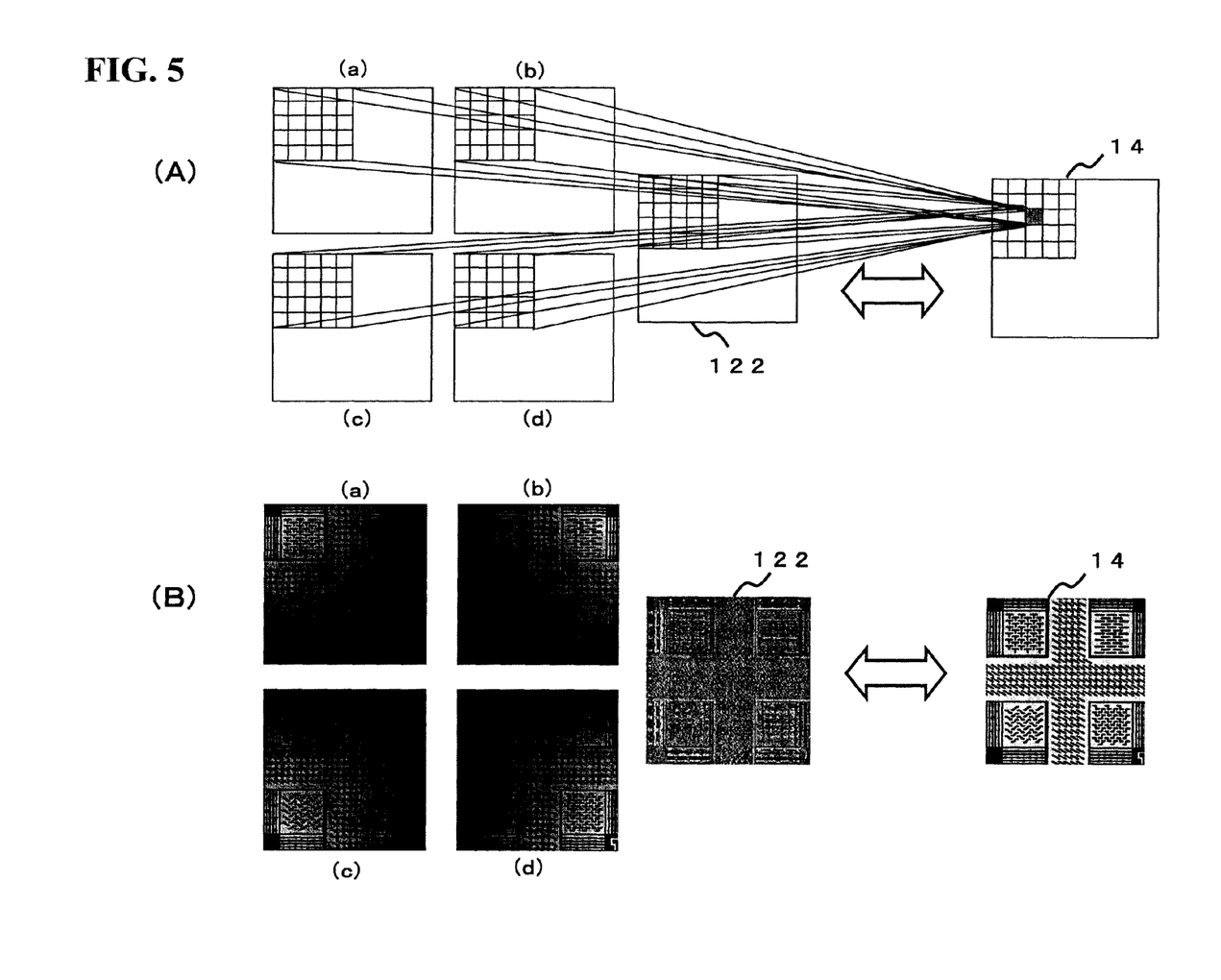
FIGS. 5A and 5B are diagrams each being for explanation of a two-dimensional (2D) linear prediction model using an area of 5×5 pixels.

As shown in FIGS. 5A and 5B, the simultaneous equation generator 620 sets up 2D linear prediction models (2D input/output linear prediction models) while regarding as 2D input data the decomposed images a to d which are generated by the decomposition image generator 61 and which correspond in number to the reference points and the high frequency division image 122 that is created by the image divider 60 and also regarding the to-be-tested image 14 as 2D output data. Examples of the input data and output data are grayscale levels and brightness or luminance of each pixel. FIGS. 5A-5B are for explanation of 2D linear prediction model of 5×5×5 using a region of 5×5 pixels. Suffices as used in this model (corresponding to the positions of 5×5 pixels) are shown in Table 1 below. Although 5×5 pixels are used here, a more or less number of ones may be employed.

TABLE 1

|   | 0 | 1 | 2 | 3 | 4 |
|---|---|---|---|---|---|
| 0 | i − 2, j − 2 | i − 2, j − 1 | i − 2, j | i − 2, j + 1 | i − 2, j + 2 |
| 1 | i − 1, j − 2 | i − 1, j − 1 | i − 1, j | i − 1, j + 1 | i − 1, j + 2 |
| 2 | i, j − 2 | i, j − 1 | i, j | i, j + 1 | i, j + 2 |
| 3 | i + 1, j − 2 | i + 1, j − 1 | i + 1, j | i + 1, j + 1 | i + 1, j + 2 |
| 4 | i + 2, j − 2 | i + 2, j − 1 | i + 2, j | i + 2, j + 1 | i + 2, j + 2 |

Let the 2D input data be u(i,j), v(i,j), w(i,j), x(i,j), z(i,j) while letting the 2D output data be y(i,j). Letting the suffices of a target pixel be "i" and "j," the suffices of twenty five (25) pixels in total in two back and forth rows and two back and forth columns which surround this pixel are shown in Table 1. For the pixel data of an area of one set of 5×5 pixels, a relational expression such as Equation (2) is set, wherein y(i,j) represents the grayscale level of a specific pixel at coordinate position (i,j) of the test image 14 whereas u(i,j), v(i,j), w(i,j), x(i,j) and z(i,j) indicate the grayscale levels of decomposed images a to d and a matrix of 5×5 pixels (those in Table 1) with the specific pixel at (i,j) in the high frequency division image 122 being as the center thereof.

Those suffices $b_{00}$ to $b_{44}$, $c_{00}$ to $c_{44}$, $d_{00}$ to $d_{44}$, $e_{00}$ to $e_{44}$, $f_{00}$ to $f_{44}$ of the input data u(i,j), v(i,j), w(i,j), x(i,j) and z(i,j) are the model parameters to be identified. Additionally in Equation (2), the model parameters are five types of ones, i.e., $b_{i,j}$, $c_{i,j}$, $d_{i,j}$, $e_{i,j}$ and $f_{i,j}$, each consisting of a matrix of 5×5 pixels, so its entirety has 125 pixels (i.e., 5×5×5). The number of unknown values becomes 125, and it is possible to identify the model parameters from Equation (2). Note here that in Equation (2), [g,p] indicates [b,u], [c,v], [d,w], [e,x], [f,z]. [b,u], [c,v], [d,w], [e,x], [f,z] is obtainable by substitution of b, c, d, e, f in place of g in an equation of [g,p] while substituting u, v, w, x, z as an alternative to p.

$$y_k = y(i, j) = [b, u] + [c, v] + [d, w] + [e, x] + [f, z] + \varepsilon(i, j) \quad (2)$$

$$[g, p] = g_{00}p(i-2, j-2) + g_{01}p(i-2, j-1) + g_{02}p(i-2, j) +$$
$$g_{03}p(i-2, j+1) + g_{04}p(i-2, j+2) + g_{10}p(i-1, j-2) +$$
$$g_{11}p(i-1, j-1) + g_{12}p(i-1, j) + g_{13}p(i-1, j+1) +$$
$$g_{14}p(i-1, j+2) + g_{20}p(i, j-2) + g_{21}p(i, j-1) + g_{22}p(i, j) +$$
$$g_{23}p(i, j+1) + g_{24}p(i, j+2) + g_{30}p(i+1, j-2) +$$
$$g_{31}p(i+1, j-1) + g_{32}p(i+1, j) + g_{33}p(i+1, j+1) +$$
$$g_{34}p(i+1, j+2) + g_{40}p(i+1, j-2) + g_{41}p(i+1, j-1) +$$
$$g_{42}p(i+1, j) + g_{43}p(i+1, j+1) + g_{44}p(i+1, j+2)$$

$$g = b, c, d, e, f$$
$$p = u, v, w, x, z$$

In Equation (2), the data $y_k$=y(i,j) of a one pixel (i,j) of the to-be-tested image 14 is represented by the linear coupling of data of 5×5 pixels which are around the one pixel (i,j) in respective five images of the four decomposed images a to d in the corresponding reference image 12 and the single high frequency division image 122 (refer to FIGS. 5A-5B). It is noted here that the residual difference ε in Equation (2) is not evident in its statistical nature, and it will possibly happen that a model parameter identification result by means of a least squares method to be later described has a bias. However, in the illustrative embodiment of this invention, its principal importance lies in the Equation (2)—based input/output data fitting per se, and the parameter values will be rarely used directly, so no appreciable problems take place.

(Equation Solving Unit for Obtaining Model Parameters)

The equation solving unit 622 is operable to solve the set of simultaneous equations of Equation (2) and obtain the model parameters. The intended model parameter identification is achievable by scanning the coordinates i, j of the four decomposed images a-d of the inspection reference image 12 and the one high frequency division image 122 plus the to-be-tested image 14 and then letting 125 sets of data be organized into a simultaneous equation system. In practical implementation, from statistical viewpoints, n (>125) sets of data are prepared; then, solve 125-dimensional simultaneous equations based on the least squares method, thereby to identify the model parameters. Examples of the method of solving these equations other than the least squares method include, but not limited to, a maximal likelihood estimation method. Any kind of method may be used.

For example, if the four decomposition images a-d of the inspection reference image 12 and the one high frequency division image 122 plus the test image 14 are each a matrix of 512×512 pixels, the 5×5-dimensional model scanning results in a decrease of 2 pixels at each side of the image's surrounding. Thus, the number of equations is given by Equation (3), that is, 258,064 sets of data are obtainable. With this approach, a statistically sufficient number of ones are acquirable.

$$n=(512-4)\times(512-4)=258064 \quad (3)$$

(Model Image Generator)

The model parameter generator 64 operates to substitute into Equation (2) the identified model parameters and the input image data used for the identification and then performs simulation processing for scanning pixel coordinates i, j to thereby generate a model image. This model image is capable of achieving, by the least squares method-based fitting, the correction of pixel position misalignment less than one pixel size, expansion/contraction and swell noises, and resize processing, sensing noises, entire image distortion and high frequency components, thereby making it possible to further correct or "amend" high frequency components while at the same time having versatility of four-corner linear weighting division-less scheme. This model image is less in image degradation and in number of setup parameters due to the combination or "integration" of the alignment and image correction. Using this model image enables obtainment of effective image correction. Note here that although the data for obtaining the model parameters can naturally contain therein defective pixels, such defective pixels are much less in number than an entirety of the data used for the identification, so they are out of the fitting in the least squares method and thus hardly appear in the model image. Moreover, the model image increases in signal to noise (S/N) ratios of its surroundings so that there is also an effect that defective pixels may be emphasized. In this way, use of the frequency division scheme in combination with the four-corner linear weighting makes it possible to correct image distortions of certain frequency components which cannot complete the fitting by mere use of the linear interpolation of pixel values.

(Comparison Processor)

As shown in FIG. 2, the comparator processor 66 operates to compare by a prespecified comparison algorithm the to-be-tested image 14 and its corresponding model image with respect to each frequency division image to thereby find defects, if any. Performing comparison per frequency division image in this way makes it easier to find defects concerning frequency characteristics. A comparison algorithm as used herein is to apply well known 3×3 pixel feature filtering (e.g., average value filtering, longitudinal edge extraction filtering, lateral edge extraction filtering, diagonal edge extraction filtering, Laplacian filter, median filter, and the like) to each of the model image and the test image 14 and then compare difference images of them, thereby making it possible to find various shapes of image defect portions.

While in prior art methods the difference image is improvable by execution of expansion/contraction and swell correction and resize correction or else, repeated execution of such correction processes would result in generation of cumulative errors, which in turn causes appreciable image degradation. Another problem faced with the prior art is that it is difficult to set up suitable values of many to parameters as needed for each correction and to determine an adequate execution order of respective correction processes.

(Image Inspection Method)

Figure 8:
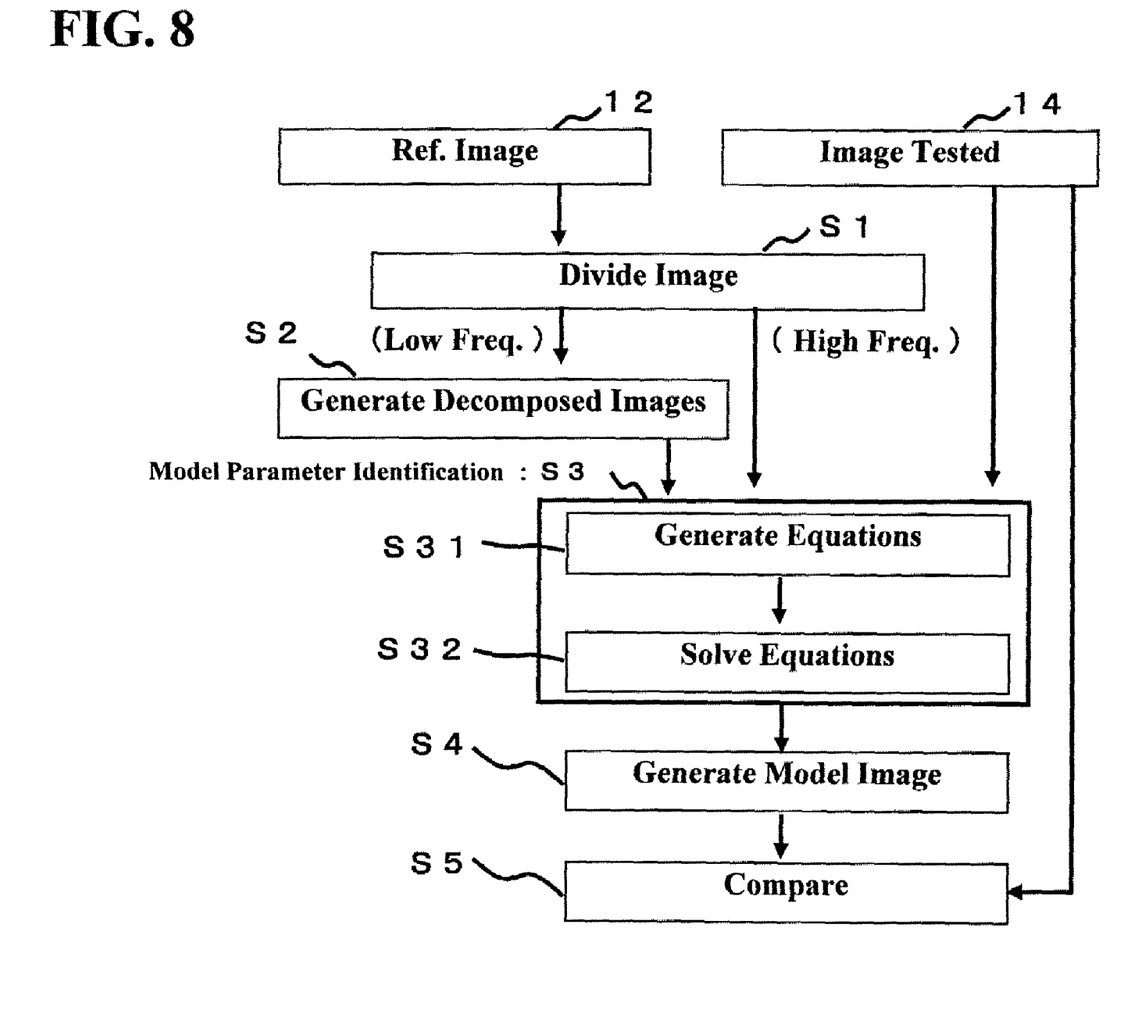
FIG. 8 is a flow diagram of an image inspection method also embodying the invention.

Turning to FIG. 8, there is shown a method for generating a model image using an inspection reference image 12 and an image 14 to be tested and for using the model image to inspect the to-be-tested image 14 for defects. The method starts with an image division step S1, which receives the reference image 12 and the test image 14 and then divides each image 12, 14 into image portions of respective frequency regions by sub-band encoding or discrete wavelet conversion techniques, thereby to create frequency division images. Then, the procedure goes to step S2 which causes the decomposition image generator 61 to generate a specific number of decomposed images, which number corresponds to the number of reference points. Next, go to step S3 which identifies model parameters by use of the above-stated scheme of FIGS. 5A-5B, Table 1 and Equation (2). This model parameter identification step S3 includes a step S31 which generates a set of simultaneous equations and a step S32 which solves the simultaneous equations generated. The simultaneous equations generated at step S31 include model parameters. At step S32 these equations are solved to obtain the model parameters. Next, go to step S4 which uses the model parameters thus obtained to produce a model image (corrected image) of each frequency division image. According to the illustrative embodiment, it is possible to provide an effective image correction method which combines or unifies alignment and image correction together and which is less in image degradation and also less in setup model parameters. In the image inspection method embodying this invention, the model image thus generated and the to-be-tested image 14 are then subjected to comparison processing using a prespecified comparison algorithm at step S5, thereby finding defective image portions, if any.

(Image Inspection Program-Written Recording Medium)

A recording medium with a software program for image inspection being written therein is a record carrier body which stores a program of the image inspection method having the process steps S1 to S5 of FIG. 8. By causing a computer to execute this program, the computer becomes a component or element of the image inspection apparatus 10 embodying the invention or, alternatively, it is possible to execute the image inspection method of this invention. Examples of the recording medium include, but not limited to, a compact disc read-only memory (CD-ROM), digital versatile disk (DVD), magneto-optical (MO) disk, large-capacity magnetic recording disk, portable hard disk drive (HDD) unit, and plug-in mass-storage device using nonvolatile semiconductor memory devices, such as electrically erasable programmable read-only memory (EEPROM) chips or "Flash" memories of the NOR or NAND type.

(Details of Image Inspection Apparatus)

Figure 6:
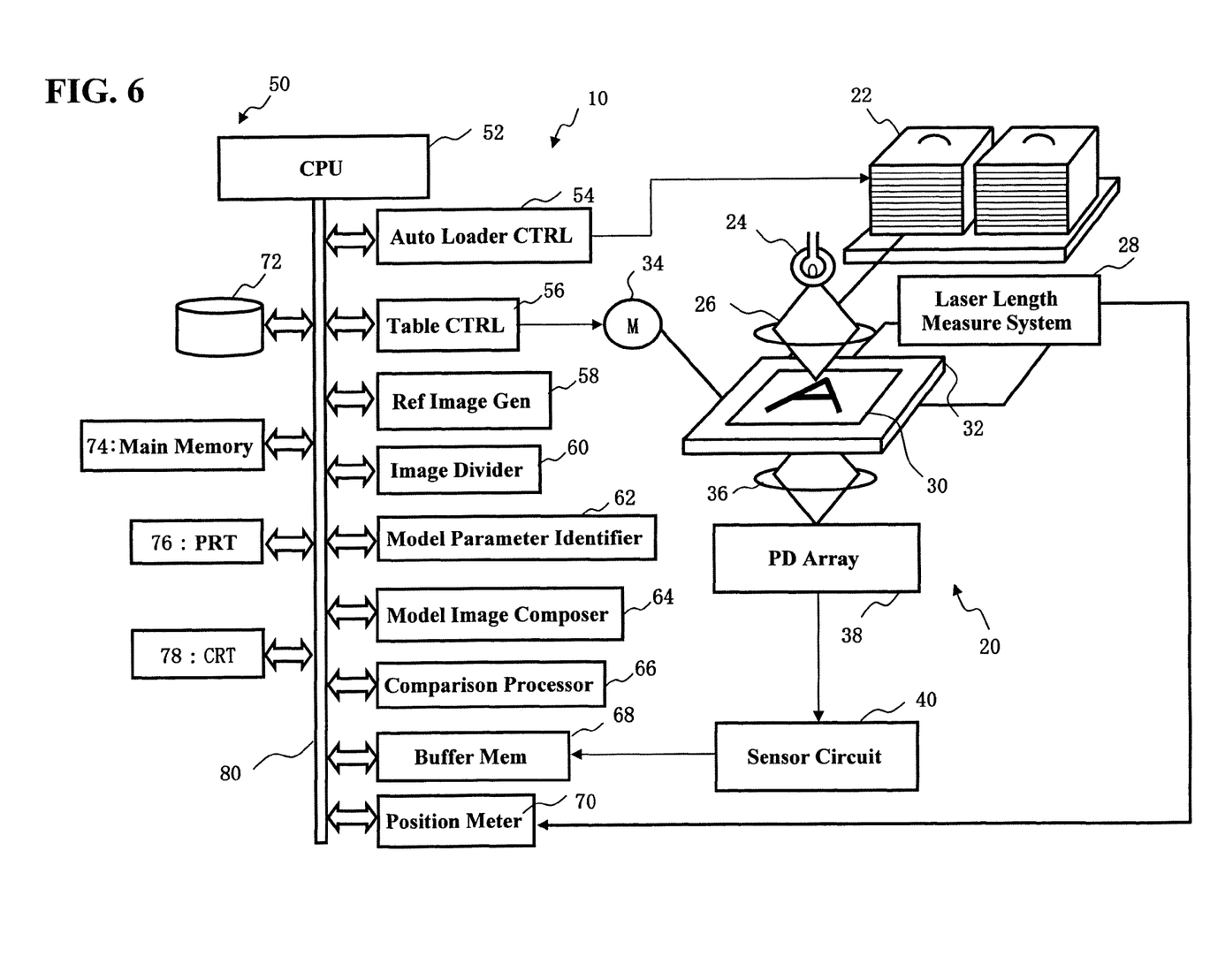
FIG. 6 is a diagram showing an overall configuration of an image inspection apparatus also embodying the invention.

Referring to FIG. 6, there is shown an overall configuration of the pattern image inspection apparatus 10. The image inspection apparatus 10 includes an optical image acquisition unit 20 which detects either reflection light or transmission light from a workpiece 30 under testing to thereby acquire its optical image, and a data processing unit 50 for storing and processing data, such as image data.

The optical image acquisition unit 20 is for acquiring an optical image of the workpiece 30 being tested, such as a reticle. The test workpiece 30 is put and held on an XYθ table 32. This table 32 is a three-axis (X-Y-θ) manipulator which is movable in X and/or Y direction and rotatable in θ direction while being driven by a table control unit 56, which operates in response to receipt of a command(s) from a central processor unit (CPU) 52. The table is driven by an XYθ motor assembly 34 in X, Y and θ directions. Examples of the motor 34 are known servo motors and stepper motors or like electric motors. The coordinates of a present location of the XYθ table 32 are measured, for example, by a laser-assisted length measurement system 28. Its output is sent to a position measurement unit 70. The position coordinate data as output from position measurement unit 70 is fed back to the table controller 56.

The workpiece 30 under testing is loaded by an auto-loader 22 onto the XYθ table 32 in an automated fashion under the control of an auto-loader control unit 54, and is automatically unloaded therefrom after completion of the inspection required. A light source 24 and an irradiation unit 26 are laid out over the XYθ table 32. Light as emitted from the light source 24 travels through a collection lens of the irradiator 26 to fall onto the test workpiece 30. Beneath the workpiece 30-supporting XYθ table 32, a signal detection unit is disposed, which is generally made up of a magnification optical lens assembly 36 and a photodiode (PD) array 38. Light that passed through the workpiece 30 travels through the magnification optics 36 and is then focussed onto a photosensitive surface of the PD array 38. The optics 36 is automatically focus-adjusted by its associated focus adjustment device (not shown) having a piezoelectric element or the like. This focus adjuster is controlled by an auto-focus control circuit (not shown) which is connected to the CPU 52. The focus adjustment may alternatively be achievable by use of a separately provided viewing monitor, e.g., observation scope. The PD array 38 serves as a photoelectric conversion unit, examples of which are a line sensor or an area sensor with a plurality of photosensors being disposed therein. By continuously moving the XYθ table 32 in X-axis direction, the PD array 38 detects or "captures" a pattern image of the workpiece 30, and then generates a measurement signal corresponding thereto.

This measurement signal is converted by a sensor circuit 40 into digital data, which is then input to a buffer memory 68 as the data of optical image sensed. The buffer memory 68 is replaceable with more than two buffer memories. An output of buffer memory 68 is sent to the comparison processing unit 66. The optical image data may be a stream of sign-less 8-bit data representing the brightness or luminance of each pixel. The image inspection apparatus 10 of this type is usually operable to read these pattern data out of the PD array 38 in a way synchronous with the clock frequency of about 10 to 30 MHz and apply thereto adequate data sorting for permitting the data to be handled as raster-scanned 2D image data. The 2D image data becomes the to-be-tested image 14 or the inspection reference image 12.

The data processor 50 is generally made up of the CPU 52, the auto-loader controller 54, the table controller 56, a referential image creation unit 58, the image divider 60, the model parameter identifier 62, the model image generator 64, the comparison processor 66, the buffer memory 68, the position measurement unit 70, an external storage unit 72, a main storage device 74, a printer 76, a display device such as cathode ray tube (CRT) monitor, and a bundle of data transfer buses 80. Design pattern data of a reticle as an example is stored in a way such that an entirety of an inspection area is divided into short narrow portions—namely, strips. The image creator 58 arithmetically expands the design pattern data to create image data and then performs processing for causing it to resemble an optical image by rounding the corner edges of graphics patterns and/or slightly defocusing or "fogging" them, thereby to form a referential image, which is stored in a storage area for DB comparison. The referential image is for later use as the inspection reference or "fiducial" image 12. Note here that the referential image is created from the design data and is used as the reference image 12 in any events, although an optical image as read out of the reticle is also usable as the reference image. Consequently, the reference image 12 is the optical image in some cases and is the referential image in other cases. The comparison processor 66 executes comparison algorithm, has parallel processing functionalities if necessary, and is equipped with a plurality of identical functions. Thus it is capable of performing processing tasks in a parallel way. Additionally the image inspection apparatus 10 is configurable from electronic circuitry, software program, firmware, personal computer (PC) or any possible combinations of more than two of them.

(Image Acquisition Method)

Figure 7:
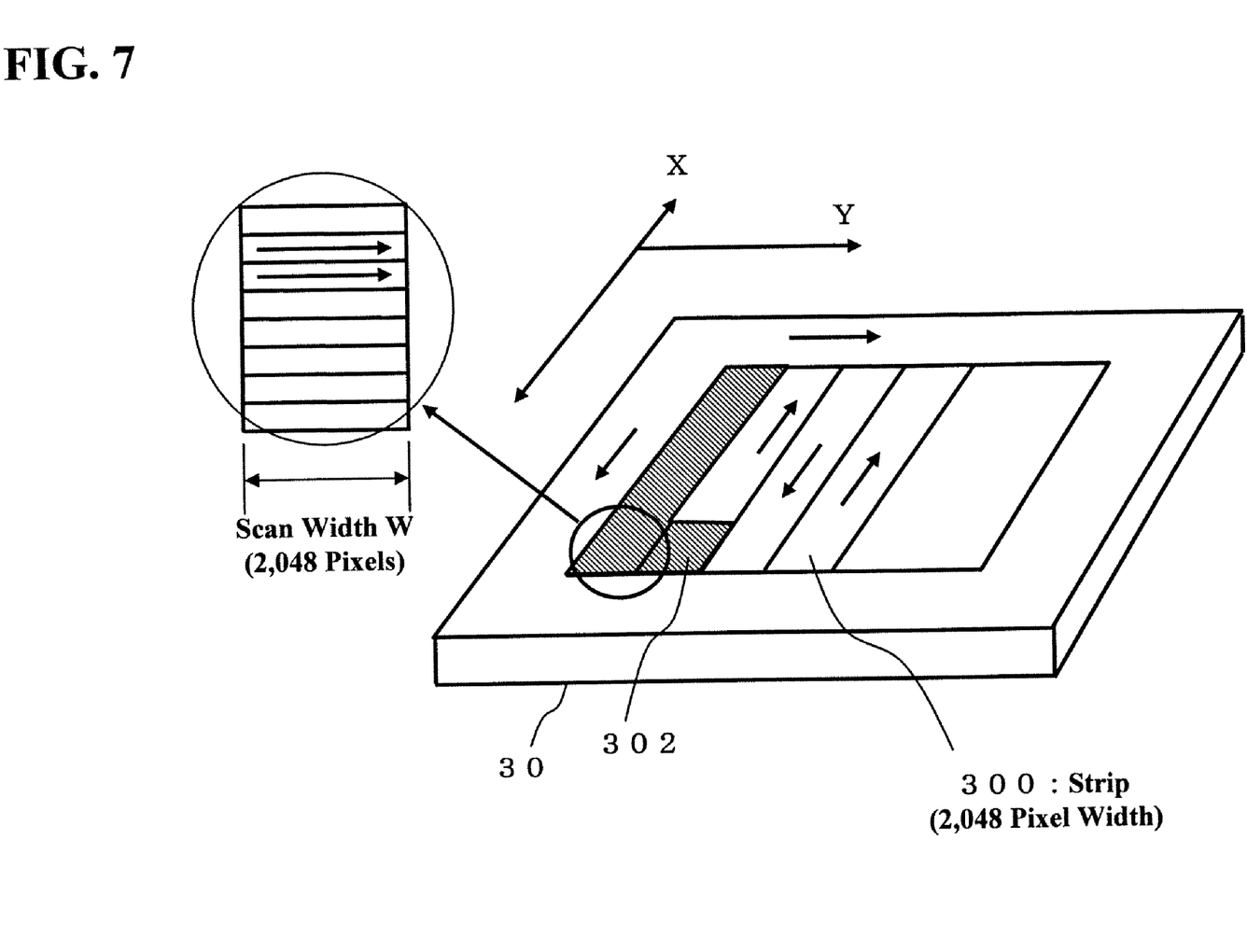
FIG. 7 is an explanation diagram of an image acquisition method.

The optical image acquisition of an ultrafine circuit pattern as drawn on the to-be-tested workpiece 30, such as a reticle, is achievable by the scanning using a line sensor. Here, for the convenience of explanation, the image of a strip-like segment (2,048 pixel width) 300 as obtained by elongate cutting in the X-axis direction (i.e., the direction of one side of the reticle) is called a one strip. The image of an almost square-shaped area 302 that is obtained by further finely cutting the one strip in Y-axis direction (the direction at right angles to X-axis direction) is called a one sub-strip. For instance, the one strip consists of a matrix of 2,048 rows and 2,048 columns of pixels. The inspection for determining whether defects are present or absent is performed on a per-substrip basis. Additionally, a single pixel has 256 different levels of grayscale.

Other various combinations are available in addition to the above-stated embodiment. Regarding the model setting and the mathematical computation scheme such as the least squares method, other schemes or techniques are applicable. Apparently this invention should not exclusively be limited to the embodiments as described herein. Although in the above-stated embodiments the inspection reference image 12 is applied the processing for division and decomposition, the image 14 being tested may alternatively be divided and decomposed. While the division number of the frequency regions are set to two, i.e., high and low frequency regions, such number may be three or greater. Additionally the reference points used for obtaining the decomposed images are set at four corners, more or less number of reference points are employable as far as these are spaced apart from one another. The invention is, therefore, to be limited only as indicated by the scope of the appended claims.

What is claimed is:

1. An image correction apparatus for generating a model image from an inspection reference image and an image to be tested, said apparatus comprising:
an image division unit operative to divide the reference image into a plurality of frequency regions to thereby form a plurality of frequency division images;
a decomposition image generation unit operative to provide reference points at a plurality of spaced-apart locations within at least one of the frequency division images and apply weighting to the frequency division image with each reference point as a reference to thereby generate decomposition images corresponding in number to the reference points;
a model parameter identification unit operative to identify a model parameter by use of two-dimensional linear prediction models of the to-be-tested image, the decomposition images corresponding in number to the reference points and a frequency division image which does not generate decomposition images; and
a model image generation unit operative to generate a model image by using the model parameter identified.

2. The apparatus according to claim 1, wherein said model parameter identification unit identifies the model parameter from a set of simultaneous equations describing therein an input/output relationship using the two-dimensional linear prediction models regarding each pixel of the to-be-tested image as an output and letting a linear coupling of pixels around each pixel be an input with respect to the decomposition images corresponding in number to the reference points and the frequency division image which does not generate decomposition images.

3. The apparatus according to claim 1, wherein said image division unit divides the reference image into a first frequency region and a second frequency region, the second frequency region being higher in frequency than the first region, to thereby form two frequency division images,
said decomposition image generation unit provides the reference points at respective apexes of a frequency division image of the first frequency region and applies weighting to the frequency division image with each reference point as a reference to thereby generate decomposition images corresponding in number to the reference points, and
said model parameter identification unit identifies the model parameter from the simultaneous equations describing the input/output relationship using the two-dimensional linear prediction model regarding each pixel of the to-be-tested image as an output and letting the linear coupling of pixels around each pixel be an input with respect to the decomposition images corresponding in number to the reference points and a reference frequency division image which does not generate decomposition images.

4. An image inspection apparatus for inspecting through comparison an inspection reference image and an image being tested, said apparatus comprising:
an image division unit operative to divide the reference image into a plurality of frequency regions to thereby form a plurality of frequency division images;
a decomposition image generation unit operative to provide reference points at a plurality of spaced-apart locations within at least one of the frequency division images and apply weighting to the frequency division image with each reference point as a reference to thereby generate decomposition images corresponding in number to the reference points;
a model parameter identification unit operative to identify a model parameter by use of two-dimensional linear prediction models of the test image, the decomposition images corresponding in number to the reference points and a frequency division image which does not generate decomposition images;
a model image generation unit operative to generate a model image by using the model parameter identified; and
a comparison processing unit for performing comparison inspection of the model image and the test image.

5. An image correction method, performed by a processor or computer, for generating a model image from an inspection reference image and an image to be tested, said method comprising:
dividing, at the processor or computer, the reference image into a plurality of frequency regions to thereby form a plurality of frequency division images;
providing, at the processor or computer, reference points at a plurality of spaced-apart locations within at least one of the frequency division images and applying weighting to the frequency division image with each reference point as a reference to thereby generate decomposition images corresponding in number to the reference points;
identifying, at the processor or computer, a model parameter by use of two-dimensional linear prediction models of the to-be-tested image, the decomposition images corresponding in number to the reference points, and a frequency division image which does not generate decomposition images; and
generating, at the processor or computer, a model image by using the model parameter identified.

* * * * *